(12) United States Patent
Foucault et al.

(10) Patent No.: US 8,177,933 B2
(45) Date of Patent: May 15, 2012

(54) METHOD TO MANUFACTURE A HOLLOW, SINGLE-PIECE BLADED DISC

(75) Inventors: Alain Foucault, Le Chatelet En Brie (FR); Etienne Juchauld, Samois sur Seine (FR); David Marsal, Nogent sur Marne (FR); Stéphane Otin, Paris (FR)

(73) Assignee: SNECMA, Paris (FR)

( * ) Notice: Subject to any disclaimer, the term of this patent is extended or adjusted under 35 U.S.C. 154(b) by 79 days.

(21) Appl. No.: 12/856,081

(22) Filed: Aug. 13, 2010

(65) Prior Publication Data

US 2011/0048620 A1    Mar. 3, 2011

(30) Foreign Application Priority Data

Aug. 17, 2009    (FR) ...................................... 09 55683

(51) Int. Cl.
 *B29C 53/56* (2006.01)
 *B65H 81/00* (2006.01)
 *F04D 29/32* (2006.01)
(52) U.S. Cl. ........ 156/173; 156/169; 156/172; 156/175; 156/185; 156/189; 415/191
(58) Field of Classification Search .................. 156/169, 156/172, 173, 175, 180, 189, 191, 192; 415/191; *B29C 70/68, 53/56; B65H 81/00, 81/02*
See application file for complete search history.

(56) References Cited

U.S. PATENT DOCUMENTS

| 3,403,844 | A | * | 10/1968 | Stoffer | 416/230 |
| 3,572,969 | A | * | 3/1971 | McLimore | 416/194 |
| 4,464,097 | A | * | 8/1984 | Schultz | 416/230 |
| 4,786,347 | A | * | 11/1988 | Angus | 156/172 |
| 5,200,012 | A | * | 4/1993 | Blavignac et al. | 156/169 |

FOREIGN PATENT DOCUMENTS

FR    2 631 083    11/1989

OTHER PUBLICATIONS

Machine translation of French Patent Publication FR-2631083, 4 pages.*
U.S. Appl. No. 13/141,852, filed Jun. 23, 2011, Marsal, et al.

* cited by examiner

*Primary Examiner* — Philip Tucker
*Assistant Examiner* — William Bell
(74) *Attorney, Agent, or Firm* — Oblon, Spivak, McClelland, Maier & Neustadt, L.L.P.

(57) ABSTRACT

A first insert (15) forming a ring is placed inside and in contact with a core (10) in degradable material. On the outer face of the core a plurality of inserts (20) is arranged each comprising a platform (21) applied against the outer face of the core and at least one blade (22) extending substantially radially outwards. A fibrous structure (56) is wound around the core passing over the platforms (21) and over the inner surface of the ring-shaped insert (15). Molding of the fibrous structure, impregnated with a composition containing a resin, is performed before polymerization of the resin and removal of the core.

12 Claims, 4 Drawing Sheets

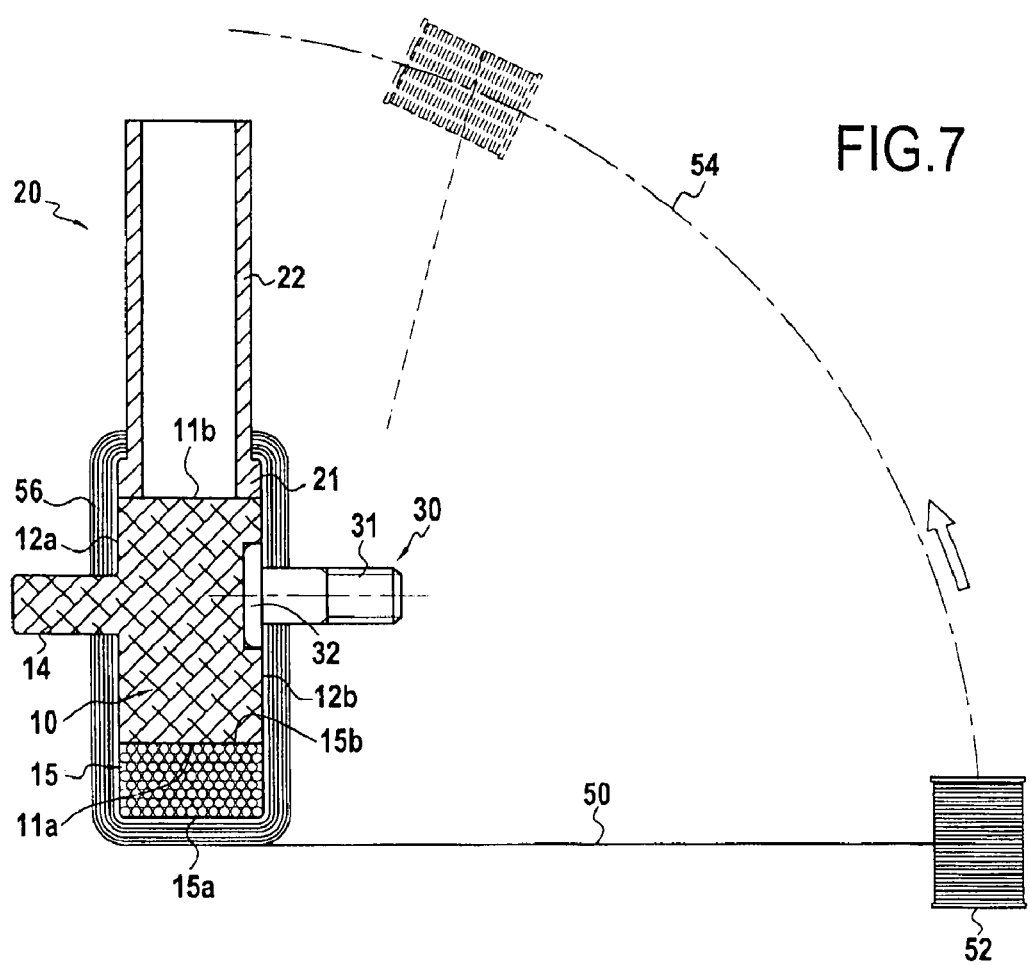

METHOD TO MANUFACTURE A HOLLOW, SINGLE-PIECE BLADED DISC

BACKGROUND OF THE INVENTION

The invention concerns a hollow, single-piece bladed disc such as a compressor or turbine disc in an aeronautic or industrial gas turbine and more particularly concerns a method to manufacture said disc.

Composite materials, notably those consisting of a fibrous reinforcement structure densified by a matrix, are increasingly being used to manufacture structural parts, in particular because they allow a reduction in weight but with equal performance compared with metal materials.

The use of said materials has been proposed for gas turbine parts, whether these are parts located in "cold portions" during operation or are elements located in "hot portions" during operation.

As examples, mention may be made of document US 2005/0 084 377 which describes the manufacture of a fan blade in composite material with a woven fibrous reinforcement and polymer matrix, and document US 2010/005 780 which describes the manufacture of a lobed mixer in a ceramic matrix composite material (CMC) for a turbo fan engine However, the techniques described in these documents are not suitable for parts of even more complex shape such as a hollow, single-piece bladed disc.

The manufacture of a bladed disc in a single piece and in a composite material with fibrous reinforcement is proposed by document FR 2 631 083. Flanges and vanes of the disc are obtained by continual winding of a cable or yarn which follows axial pathways for the blades and extends in substantially radial planes for the flanges. The method requires the use of highly complex dismountable tooling to define the spaces in which the cable or yarn is wound. In addition, in the blades, the direction of the fibrous reinforcement is axial, which is not optimal with respect to the direction of applied forces.

SUBJECT AND SUMMARY OF THE INVENTION

The object of the invention is to remedy these disadvantages and for this purpose proposes a method comprising the steps of:
  providing a rigid, ring-shaped core having an inner annular face, an outer annular face and two side faces,
  positioning a first insert forming a ring having an outer surface in contact with the inner face of the core and an inner surface,
  arranging on the outer face of the core a plurality of second inserts each comprising a platform applied against the outer face of the core and at least one blade of the disc to be formed extending substantially radially outwards from the platform,
  winding a fibrous structure all round the core, each turn passing along a side face of the core, over a platform of a second insert, along the other side face of the core and over the inner surface of the first insert, the wound fibrous structure forming an assembly of the second inserts with the first insert,
  moulding the fibrous structure impregnated with a composition containing a resin,
  polymerizing the resin, and
  removing the core.

Therefore, the invention is noteworthy in that it allows a hollow bladed disc to be obtained in a single piece.

The fibrous structure can be formed by winding yarn, cables or tape.

Preferably, winding is performed on the platforms of the second inserts, between the blades.

Further preferably, along a side face of the core, each turn segment follows a pathway forming a non-zero angle relative to the radial direction at the position of this segment. Advantageously, in this case, along a side face of the core, segments of turns intersect forming non-zero angles of opposite sign relative to the radial direction at the position of these segments.

A first insert may be used having a U-shaped cross-section whose branch ends bear upon the inner face of the core, making it possible to lighten the bladed disc.

Advantageously, the first insert is in a composite material with fibrous reinforcement.

Third inserts may be positioned, on at least one of the side faces of the core to form connecting parts. Said connecting parts are intended to allow the mounting of the bladed disc and the transmission of radial and axial forces to the adjacent parts.

At least one fourth insert may be positioned at the outer face of the core to form an annular reinforcement. For example, fourth inserts forming reinforcement rings may be arranged in housings in the outer face of the core in the vicinity of its side faces.

On at least one of its side faces, the core may be provided with protruding pins and the winding is made around the pins so as to form side orifices in the hollow disc after removal of the core. Said orifices allowing ventilation of the inside of the bladed disc are therefore formed at the winding stage.

BRIEF DESCRIPTION OF THE DRAWINGS

The invention will be better understood on reading the description given below by way of indication but is non-limiting, with reference to the appended drawings in which:

FIG. 7 is a partial schematic view in radial section showing the winding step of the method in FIG. 2;

DETAILED DESCRIPTION OF EMBODIMENTS OF THE INVENTION

Figure 1:
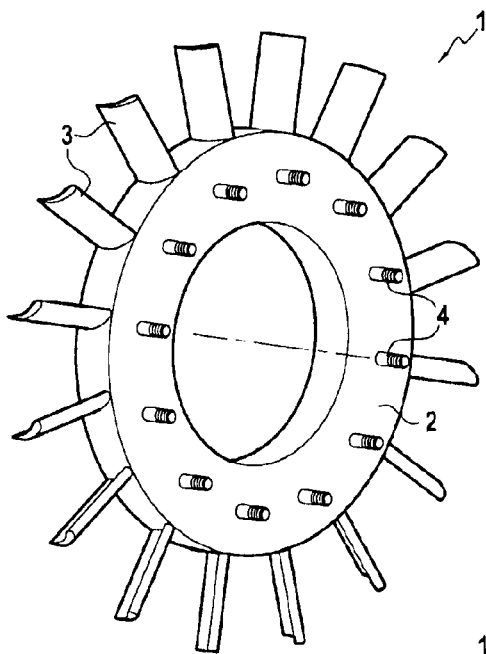
FIG. 1 is a very schematic perspective view showing a single-piece bladed disc such as can be manufactured using a method conforming to the invention.

FIG. 1 very schematically illustrates a hollow, single-piece bladed disc 1 such as a compressor disc or turbine disc of an aeronautic or industrial gas turbine.

The disc 1 comprises a hollow ring 2 on the periphery of which a plurality of blades 3 are distributed joined to the ring 2. On one of its side faces, the ring 2 is provided with a plurality of fasteners 4 which extend axially. The fasteners 4 are distributed circumferentially and regularly in a row and are intended to allowing the mounting of the disc. On the other face, orifices (not visible in FIG. 1) allow communication between an inner cavity of the ring 2 and the outside, these orifices being distributed circumferentially, for example regularly in a row. The blades 3 are hollow blades whose inner cavities communicate with the cavity of the ring 2 and which open outwardly through orifices (not shown) generally formed through their intrados walls, leading edges, trailing edges and bathtub-shaped apexes.

Figure 2:
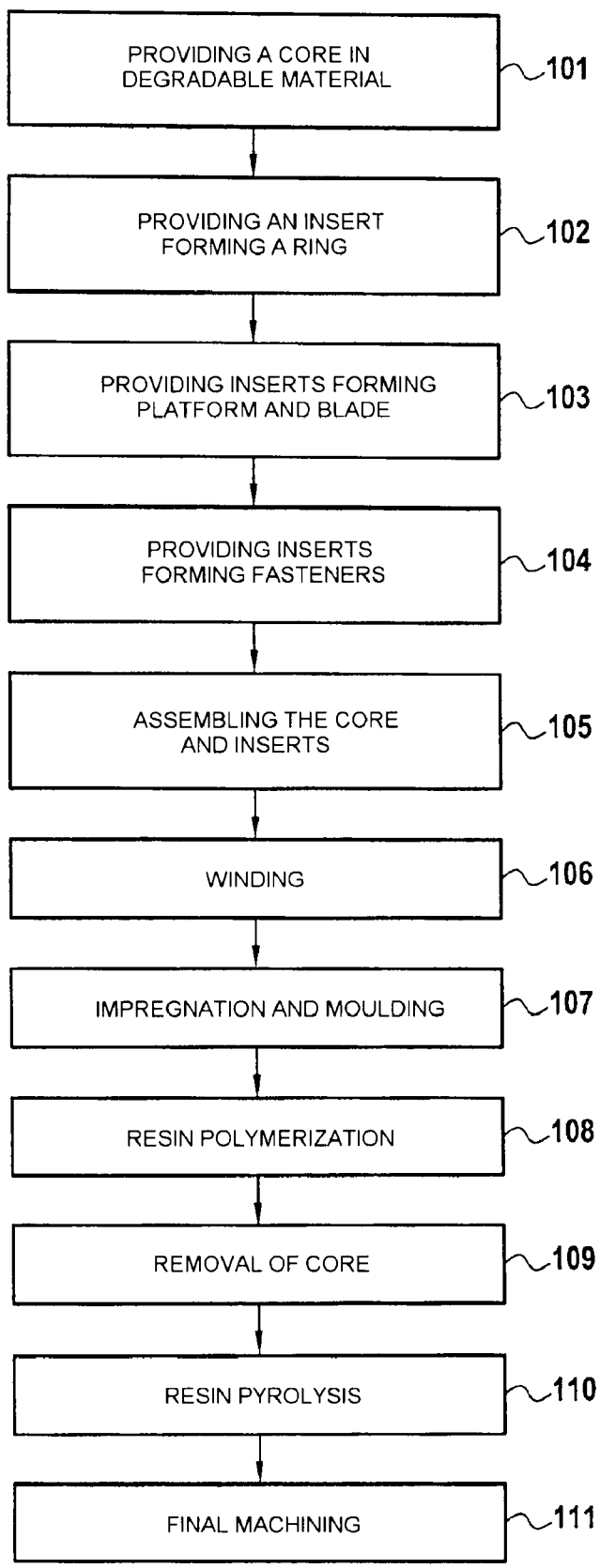
FIG. 2 indicates successive steps of a method to manufacture a disc such as the one shown in FIG. 1, according to one particular embodiment of the invention.

Different successive steps to manufacture a hollow disc such as the one shown in FIG. 1 are indicated in FIG. 2.

Figure 3:
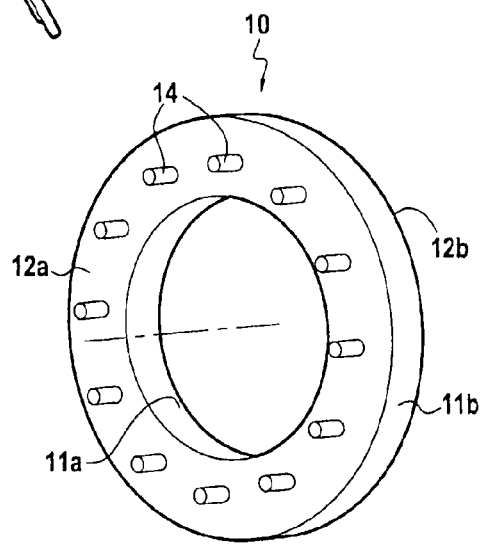
FIG. 3 is a schematic perspective view of a core used to implement the method in FIG. 2.

A first step 101 consists of providing a rigid core 10 (FIG. 3) intended to define the geometry of the inner cavity of the ring of the disc and of the orifices causing it to communicate with the outside. The core 10 is ring-shaped with an annular inner face 11a, an annular outer face 11b and opposite side faces 12a, 12b. The faces 11a, 11b here are cylindrical, whilst the faces 12a, 12b are radial. On the side face 12a, the core 10 has pins 14 which project from the side face, for example axially, and are distributed circumferentially and regularly.

The core 10 is in degradable material able to be removed without deteriorating the constituent parts of the disc. It is possible for example to use a core in a metal alloy with low melting point such as those in the "MCP" range by the British company "Mining & Chemical Products Ltd", or a core in material which can be removed by chemical attack such as a core in soft iron which can be removed by attack with nitric acid. Other materials can be envisaged, for example wax, plaster or cement provided they impart sufficient rigidity to the core to withstand the winding step and sufficient temperature resistance to withstand a subsequent polymerization step without damage, and provided they can be removed for example by a solvent, by acid attack or by melting without affecting the integrity of the constituent parts of the disc. The core 10 can be formed by moulding or machining for example.

Figure 4:
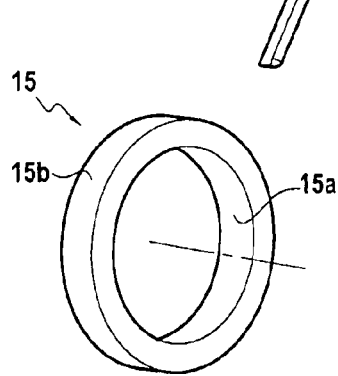
FIG. 4 is a partial schematic view in radial section of an insert forming a ring used to implement the method.

A second step 102 consists of providing a first ring-shaped insert 15 (FIG. 4) intended to house itself in the core 10, in contact with the inner face 11a. The ring 15 has an inner surface 15a, an outer surface 15b of diameter corresponding to the diameter of face 11a and an axial dimension substantially equal to that of the core 10 (excluding the pins 14).

The ring 15 may be in metal or preferably in a composite material with fibrous reinforcement. Said ring 15 in composite material can be manufactured by forming an annular fibrous preform and by densifying it with a matrix. The fibrous preform can be formed by filament winding of yarn, cable or tape in several stacked layers (as shown in FIG. 7). The fibrous preform is densified, for example by impregnating with a composition containing a resin and polymerization of the resin. Depending on the range of temperatures encountered in operation, the matrix may be a polymer matrix e.g. epoxy or a carbon or ceramic matrix. A carbon or ceramic matrix can be obtained by pyrolysis of a carbon-precursor resin (e.g. a phenol resin) or a pre-ceramic or ceramic-precursor resin (for example polycarbosilane or polycarbosilazane for a matrix essentially formed of silicon carbide SiC). The fibres of the preform may be in carbon or ceramic. It is to be noted that the fibrous preform can also be fabricated by stacking layers, for example by winding a woven strip, the layers being possibly joined together by needling for example, or by using three-dimensional (3D) or multi-layer weaving, these different techniques being well known per se.

Figure 5:
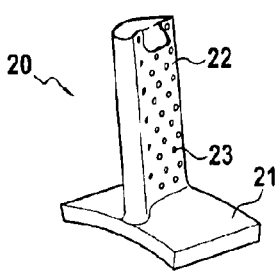
FIG. 5 is a partly exploded, schematic perspective view of an insert forming a platform and blade used to implement the method in FIG. 2.

A third step 103 consists of providing a plurality of second inserts 20 forming a platform 21 and blade 22 (FIG. 5) intended to be arranged on the periphery of the core 10, against its outer face 11b. The blades 22 are preferably hollow blades with small orifices 23 causing the inner cavity of a blade to communicate with the outside, the orifices 23 notably being formed through the intrados wall of the blade. The platform 21 is curved for application against the face 11b of the core and its axial dimension is substantially equal to that of the core 10 (excluding the pins 14). The platform 21 has a passage passing through it that is positioned in the continuity of the inner cavity of the blade 22. The inserts 20 can be metallic and obtained by smelting. They can also be made in composite material with a fibrous reinforcement densified by a matrix, the type of fibres and type of matrix being chosen in relation to the range of temperatures encountered in operation, as for the insert 15. It is possible to use second inserts each having a plurality of blades carried by a same platform.

Figure 6:
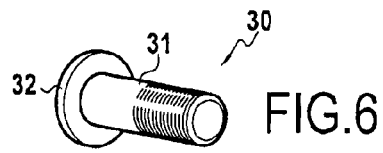
FIG. 6 is a schematic perspective view of an insert forming a fastener to implement the method in FIG. 2.

A fourth step 104 optionally consists of providing a plurality of third inserts 30 forming fasteners (FIG. 6). In the illustrated example, each insert 30 comprises a threaded rod 31 provided with a head 32.

Step 105 consists of assembling the core 10 with the inserts 15, 20 and 30. The ring 15 is housed against the inner face 11a of the core 10 as indicated above. The inserts 20 are arranged against the outer face 11b of the core, the dimensions of the platforms 21 being chosen so that they can be arranged contiguously. The inserts 30 are arranged on the side face 12b of the core 10, the heads of the inserts being placed in corresponding housings formed in face 12b for this purpose (see FIG. 7).

The inserts 15, 20 and 30 can be held in placed by bonding.

As a variant, the inserts 15, 20 and 30 can be integrated in the core 10 when the latter is being fabricated, the core 10 then preferably being obtained by moulding. Evidently, in this case, step 101 is omitted being merged with step 105.

Figure 8:
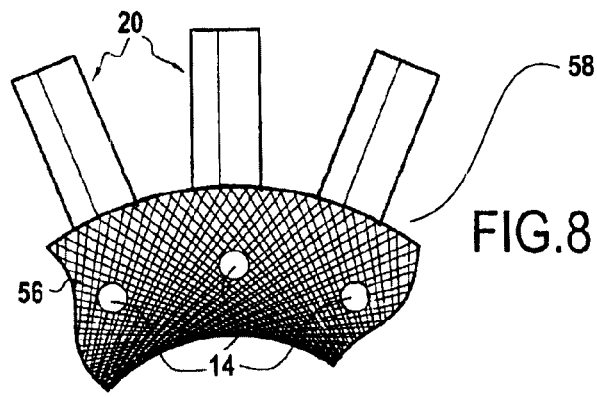
FIG. 8 is a detailed view showing the pathway of the yarns on a side face of the core during winding.

The following step 106 of the method consists of winding to form the complete ring of the disc, as shown in FIG. 7. Winding is made with yarns, cables or tape 50 which form turns passing over the inner surface 15a of the ring 15, along the side face 12b of the core 10, between the rods 31 of the inserts 30, over the platforms 21 of the inserts 20, between the blades 22, and along the side face 12a of the core 10, between the pins 14. Winding is conducted in several stacked layers. As shown in FIG. 8, along a side face of the core 10, each segment of a turn preferably extends by forming a non-zero angle relative to the mean radial direction at the position of this segment. In addition, in stacked turns, the segments intersect forming non-zero angles of opposite direction relative to the radial direction. Improved mechanical resistance can thereby be obtained.

The yarns, cable or tape 50 are in carbon fibre for example or ceramic fibres. When the temperatures encountered in operation are high, as is the case for a turbine disc, ceramic fibres are preferably used e.g. SiC fibres such as those marketed under the name "NICALON" by the Japanese company Nippon Carbon.

For winding, a spool 52 is used on which the yarn, cable or tape 50 is stored and the spool 52 is caused to follow a pathway passing from inside to outside the annular assembly formed by the core 10 and the inserts 15, 20 and 30, being guided along a closed circuit 54. At the same time and in coordinated manner, the annular assembly formed by the core 10 and the inserts 15, 20 and 30 is moved in rotation about its axis, for example being driven by wheels engaging by friction with the inner face of the disc during winding, or being driven via the blades 22, the inserts 30 or the pins 14 of the core 10.

In this way, a wound fibrous structure 56 is obtained which forms the assembly of the inserts 20 with the ring 15 and holds the inserts 30 in place whose heads bear against the inner surface of the fibrous structure 56. The platforms 21 of the inserts facilitate winding and provide good resistance of the assembly to stresses.

Figure 9:
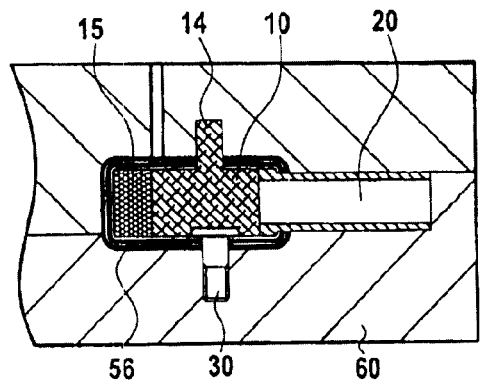
FIG. 9 is a partial schematic radial-section view showing the moulding step of the method in FIG. 2.

After winding, a moulding operation (step 107) is performed. For this purpose, the assembly is placed in a mould 60 (FIG. 9) and the fibrous structure 56 is impregnated with a composition containing a resin, for example by injection in the mould in manner known per se. As a variant, winding can be have been made using a pre-impregnated yarn, cable or tape. Moulding can impart the desired outer geometry to the fibrous structure 56.

A resin is chosen in relation to the range of temperatures of the envisaged application of the disc. At low temperatures, a resin may be used which, after polymerization, directly gives the matrix of the desired composite material e.g. an epoxy resin. It is also possible to use a carbon-precursor resin giving a carbon matrix by pyrolysis after polymerization.

For higher temperatures, a ceramic-precursor resin is preferably used, giving a ceramic matrix by pyrolysis after polymerization. Ceramic-precursor resins are well known; for example polysiloxane or polysilazane resins may be used to give a matrix essentially formed of SiC.

At step 108, polymerization of the resin is performed in the mould by raising the temperature. This gives a part of the composite ring 58 formed by the fibrous structure 56 densified by the polymerized resin and joining the inserts 20 to the insert 15.

The assembly is then removed from the mould and, at step 109, the core 10 is removed. This gives the inner cavity of the ring of the disc and the orifices causing it to communicate with the outside. As described above, the removal of the core is obtained for example by dissolving, by acid attack or melting, the evacuation in liquid state being made via the orifices of the disc.

At step 110, pyrolysis of the polymerized resin is optionally carried out to obtain a fibrous structure 56 densified by a carbon or ceramic matrix.

A hollow, bladed disk is therefore obtained comprising the insert 15, the inserts 20 comprising the blades 22 of the disc, the optional inserts 30 and the composite part of the ring 58.

One or more additional cycles of impregnation with a composition containing a resin, of polymerization and of pyrolysis can be conducted to reduce porosity.

Reduction in porosity can also be obtained by carrying out additional densification using Chemical Vapour Infiltration (CVI) or Melt Infiltration.

Densification processes with carbon or ceramic obtained by CVI are well known. Melt infiltration can be conducted with silicon for example. When the residue of resin pyrolysis is carbon, a silicon carbide is obtained by reaction between the silicon and the carbon with a suitable rise in temperature as is known per se.

Final machining (step 111) may optionally be performed to obtain a hollow disc with the desired dimensions. The blades 22 being formed by the inserts 20, machining thereof is not necessary.

Figure 10:
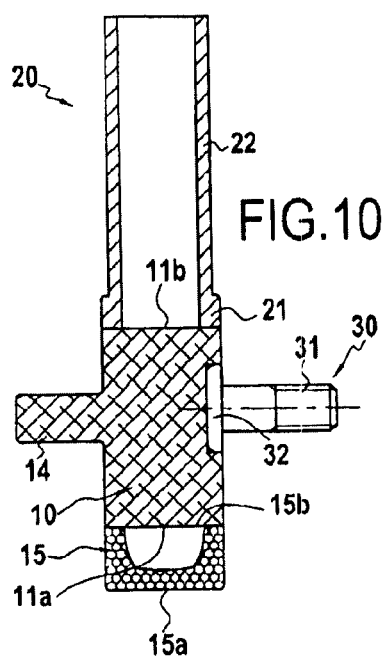
FIG. 10 is a partial radial-section view showing a variant of the method in FIGS. 1 to 6.

FIG. 10 shows a variant of embodiment which differs from the variant described above in that the first ring-shaped insert 15 has a U-shaped cross-section with the ends of the U branches bearing against the inner face 11a of the core 10. This can lighten the weight of the formed disc.

Figure 11:
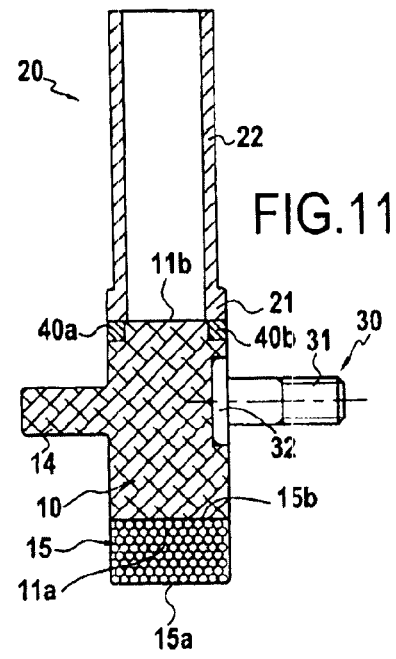
FIG. 11 is a partial radial-section view showing another variant of the method in FIGS. 1 to 6.

FIG. 11 shows another variant of embodiment which differs from the variant described above with reference to FIGS. 2 to 9 in that fourth additional inserts in ring form 40a, 40b are used e.g. metal rings. The rings 40a, 40b are inserted in housings formed in the outer face 11b of the core 10, at the side ends thereof. The rings 40a, 40b form an additional reinforcement.

Evidently, the variants in FIGS. 10 and 11 can be combined with each other.

The invention claimed is:

1. Method to manufacture a hollow, single-piece bladed disc in composite material, comprising the steps of:
   providing a ring-shaped core having an annular inner face, an outer annular face and two side faces,
   placing in position a first insert forming a ring having an outer surface in contact with the inner face of the core and an inner surface,
   arranging on the outer face of the core a plurality of second inserts each comprising a platform applied against the outer face of the core and at least one blade of the disc to be formed extending substantially radially outwards from the platform,
   winding a fibrous structure around the core, comprising turns each passing along a side face of the core, over a platform of a second insert, along the other side face of the core and over the inner surface of the first insert, the wound fibrous structure forming an assembly of the second inserts with the first insert,
   moulding the fibrous structure impregnated with a composition containing a resin,
   polymerizing the resin, and
   removing the core.

2. Method according to claim 1, wherein the fibrous structure is formed by winding yarns, cable or tape in several stacked layers.

3. Method according claim 1, wherein winding is performed on the platforms of the second inserts, between the blades.

4. Method according to claim 1 wherein, along a side face of the core, each turn segment follows a pathway forming a non-zero angle relative to the radial direction at the position of this segment.

5. Method according to claim 4 wherein, along a side face of the core, turn segments intersect forming non-zero angles of opposite sign relative to the radial direction at the position of these segments.

6. Method according to claim 1, wherein a first insert is used having a U-shaped cross-section whose branch ends bear upon the inner face of the core.

7. Method according to claim 1, wherein a first insert is used in composite material with fibrous reinforcement.

8. Method according to claim 1, wherein second inserts are used with hollow blades.

9. Method according to claim 1 wherein third inserts are positioned on at least one of the side faces of the core to form connecting parts.

10. Method according to claim 1 wherein at least one fourth insert is positioned at the outer face of the core to form an annular reinforcement.

11. Method according to claim 10, wherein fourth inserts forming reinforcement rings are arranged in housings in the outer face of the core in the vicinity of its side faces.

12. Method according to claim 1, wherein on at least one of its side faces, the core has projecting pins and winding is made around the pins to form side orifices in the hollow disc after removal of the core.

\* \* \* \* \*